United States Patent [19]

Paar et al.

[11] Patent Number: 5,057,559
[45] Date of Patent: Oct. 15, 1991

[54] CATIONIC PAINT BINDERS CONTAINING THE REACTION PRODUCT OF EPOXIDES AND SUBSTITUTED CARBAMIC ACID DERIVATIVES

[75] Inventors: Willibald Paar; Rudolf Schipfer, both of Graz, Austria

[73] Assignee: Vianova Kunstharz, A.G., Werndorf, Austria

[21] Appl. No.: 241,113

[22] Filed: Sep. 6, 1988

[30] Foreign Application Priority Data

Sep. 3, 1987 [AT] Austria ................................ 2216/87

[51] Int. Cl.$^5$ ............................................. C08L 63/00
[52] U.S. Cl. .................................... 523/414; 523/415; 523/417; 523/420; 525/504; 528/45; 528/73; 528/119; 528/367; 528/369
[58] Field of Search ............... 523/414, 415, 417, 420; 525/504; 528/45, 119, 369

[56] References Cited

U.S. PATENT DOCUMENTS

| | | | |
|---|---|---|---|
| Re. 30,264 | 4/1980 | Schimmel | 523/414 |
| 2,995,531 | 8/1961 | Hudson | 524/300 |
| 3,799,854 | 3/1974 | Jerabek | 204/181.7 |
| 3,922,253 | 11/1975 | Jerabek | 528/45 |
| 3,935,087 | 1/1976 | Jerabek et al. | 523/415 |
| 3,984,299 | 10/1976 | Jerabek | 523/415 |
| 4,009,133 | 2/1977 | Jones | 528/45 |
| 4,017,438 | 4/1977 | Jerabek et al. | 523/420 |
| 4,031,050 | 6/1977 | Jerabek | 528/45 |
| 4,038,232 | 7/1977 | Bosso et al. | 523/414 |
| 4,101,486 | 7/1978 | Bosso et al. | 523/415 |
| 4,129,490 | 12/1978 | Schimmel | 523/420 |
| 4,148,772 | 4/1979 | Marchetti et al. | 523/420 |
| 4,163,815 | 8/1979 | Cheung | 528/45 |
| 4,170,579 | 10/1979 | Bosso et al. | 523/415 |
| 4,260,716 | 4/1981 | Christenson et al. | 528/45 |
| 4,260,727 | 4/1981 | Floyd | 523/414 |
| 4,296,010 | 10/1981 | Tominaga | 528/45 |
| 4,339,368 | 7/1982 | Tsou et al. | 524/901 |
| 4,435,559 | 3/1984 | Valko | 528/73 |
| 4,454,264 | 6/1984 | Patzchke et al. | 523/415 |
| 4,484,994 | 11/1984 | Jacobs et al. | 528/99 |
| 4,528,363 | 7/1985 | Tominaga | 528/370 |
| 4,536,558 | 8/1985 | Kordomenos | 523/417 |
| 4,576,979 | 3/1986 | Schupp et al. | 523/414 |
| 4,596,744 | 6/1986 | Anderson et al. | 528/45 |
| 4,605,690 | 8/1986 | Debroy et al. | 523/414 |
| 4,711,917 | 12/1987 | McCollum et al. | 523/414 |
| 4,785,068 | 11/1988 | Tominaga et al. | 528/45 |
| 4,897,435 | 1/1990 | Jacobs | 528/99 |

FOREIGN PATENT DOCUMENTS 1247288 1/1973 Canada .
1303480 1/1973 United Kingdom .

*Primary Examiner*—Earl A. Nielsen
*Assistant Examiner*—Frederick Krass
*Attorney, Agent, or Firm*—Breiner & Breiner

[57] ABSTRACT

Cationic paint binders based on the reaction products of epoxide compounds with substituted carbamic acid derivatives and the use thereof in the formulation of cathodically deposited paints are described. The carbamic acid derivatives are urethanes, ureas, allophanates, and biuret compounds. Crosslinking functionality and/or protonatable groups are introduced by a suitable selection of blocking agents for the isocyanate compounds utilized. The reaction between the epoxide compounds and carbamic acid derivatives takes place in the presence of basic groups under relatively mild conditions; and, even when several carbamic acid moieties are present in a molecule, a readily soluble product is obtained.

22 Claims, No Drawings

CATIONIC PAINT BINDERS CONTAINING THE REACTION PRODUCT OF EPOXIDES AND SUBSTITUTED CARBAMIC ACID DERIVATIVES

FIELD OF INVENTION

The invention relates to a process for preparing cationic paint binders based on the reaction product of epoxide compounds with substituted carbamic acid derivatives; to the binders produced by the process, and to the use of the binders in the formulation of cathodically depositable paints.

BACKGROUND OF INVENTION

The use of completely blocked polyisocyanates for the crosslinking of cationic binders, including those binders which are used in cathodically depositable paints are known, for example in U.S. Pat. No. 2,995,531; DE-AS 20 57 799, and U.S. Pat. No. 3,799,854. In mixtures of low molecular weight resin components, particularly in electrodeposition systems, disproportionation of the paint material occurs.

To overcome the separation problem, a large number of binders have been developed wherein the introduction of protonizable groups is carried out by amine addition to the epoxide group or by a urethane reaction using diisocyanates which are amine-blocked on one side with hydroxyl groups of an epoxy resin or by etherification reactions with corresponding phenol alkylation products. Crosslinking groupings which result in film formation at elevated temperature are also introduced into such resin systems.

SUMMARY OF INVENTION

It has now been found that the reaction of epoxide compounds with substituted carbamic acid derivatives provides a convenient method of introducing basic and/or crosslinking groupings into paint binders. Surprisingly, it has been found that the reaction of epoxide compounds with substituted carbamic acid derivatives can be carried out under relatively mild reaction conditions with the catalytic action of basic groups. The formation of non-gelled and readily soluble products occurs even when there are several carbamic acid moieties in a molecule. It is believed this occurs as a result of steric hindrance or low activation of the components. In this way it is possible to incorporate into an epoxy resin a large number of functional groups which are necessary for protonation and crosslinking, or which are influential in film formation or in bringing about the desired film properties.

The present invention, therefore, relates to cationic paint binders which can be diluted with water after protonation, based on modified epoxide compounds, characterized in that (A) an epoxide compound having one or more epoxide groups is reacted with (B) a substituted carbamic acid derivative of the formula

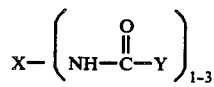

wherein

X represents an optionally substituted, aliphatic, cycloaliphatic or aromatic group which is the moiety of a mono- or polyisocyanate compound when reacted with a compound carrying a reactive H-atom, Y represents the group —OR or —NH—R or

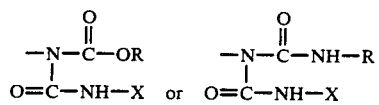

and

R represents an alkyl or tert.-aminoalkyl group; at least one of the components (A) or (B) containing basic groups, preferably in the form of tertiary amino groups. The reaction of (A) and (B) is carried out at from about 60° to 120° C., in the presence of a reaction-inert solvent to obtain a product substantially free from epoxide groups. Optionally a stoichiometric excess of epoxide groups is employed, with the excess groups being reacted with amino and/or carboxyl and/or hydroxyl compounds before, simultaneously with, or after the reaction of (A) and (B). The end product must contain protonatable groups corresponding to an amine number of at least 30 mg KOH/g.

The invention further relates to a process of preparing the binders and the use of the binders in waterthinnable paints, particularly paints suitable for cathodically depositable electrodeposition paints.

GENERAL DESCRIPTION OF INVENTION

In the event the binders of this invention are intended for use in electrodeposition paints, the epoxy resins used in the reaction preferably are the standard commercial diepoxy resins based on diphenols, such as diphenylolpropane, and epichlorohydrin, with an epoxy equivalent weight of about 190 to about 1000, or polyepoxy resins based on novolak resins with an epoxide equivalent weight of about 170 to about 250. Aliphatic mono- or polyepoxide compounds such as glycidylesters of carboxylic acids, e.g., the KOCH-acids, or glycidylethers of mono- or polyalcohols or epoxidized olefins or epoxidized diene polymers may be used in small amounts or for specific applications, e.g., as pigment dispersing resins.

The substituted carbamic acid derivatives suitable for use according to this invention have the formula

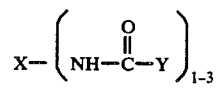

wherein

X represents an aliphatic, cycloaliphatic, or aromatic group, which may have substituted groups, such as remains when a mono- or polyisocyanate compound is reacted with a compound carrying a reactive H-atom, Y represents the group —OR or —NH—R or

and

R represents an alkyl or tert.-aminoalkyl group.

These carbamic acid derivatives are obtained by reacting at least one isocyanate group of a mono- or polyisocyanate compound with (a) an aliphatic mono-alcohol optionally containing a tert.-amino group, to form a urethane (Y=—OR)—, or (b) an aliphatic primary amine which optionally contains an additional tertiary amino group, to form a substituted carbamic acid diamide (Y=—NH—R), or (c) further reaction of a compound obtained according to (a) with another monoisocyanate compound to form an allophanate

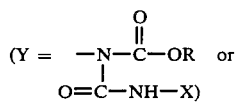

(d) further reaction of a compound obtained according to (b) with another monoisocyanate compound to form a biuret

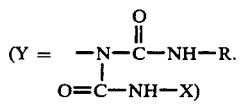

The isocyanate compounds used are mainly derivatives of the standard commercial diisocyanates, preferably of those which contain, at least predominantly, NCO-groups with varying reactivity. Preferred examples of this group are 2,4-toluylenediisocyanate (TDI), commercially available containing approximately 20% 2,6-toluylenediisocyanate, or isophoronediisocyanate (IPDI), also called 3-isocyanatomethyl-3,5,5-trimethylcyclohexylisocyanate.

The monoisocyanates preferably used are diisocyanates, as above identified, semi-blocked with a suitable blocking agent. By the choice of isocyanate and blocking agent, it is possible to introduce either crosslinking functionality and/or catalytically active and protonatable amine functionality into the molecule. Similarly, monoisocyanate compounds of the isocyanatoethylmethacrylate type or hydroxyalkyl(meth)acrylates as semi-blocking agents for diisocyanates may also be used. In this case, it is possible to provide crosslinking by thermal polymerization. The polyisocyanate compounds used may, for example, be prepolymers of diisocyanates and polyols such as trimethylolpropane, inter alia, polyetherpolyols or polyesterpolyols, which are either commerically available or known from the literature. Similarly, products such as triphenylmethanetriisocyanate and the like may also be used. In such cases, the blocking agent must be used in a quantity which leaves on an average one NCO-group unreacted. For groups (a) and (c) above, the blocking agents used which form the group R are aliphatic mono-alcohols or tertiary monoalkanolamines such as the N,N-dialkylalkanolamines. For groups (b) and (d) above, aliphatic or cycloaliphatic primary monoamines are used, such as alkylamines with four or more carbon atoms, or cyclohexylamine, or preferably prim.-tert.-diamines such as N,N-dialkylaminoalkylamines, e.g., N,N-diethylpropylenediamine-1-3 and homologous compounds, as the blocking agent.

The basic catalysis necessary for the reaction of the substituted carbamic acid with the epoxide groups is effected by means of the basic groups present in the components, which, after being protonated, will subsequently also determine the ability of the products to be diluted with water. These basic groups can be either on one or both of the epoxy compounds (component A) and the carbamic acid component (component B). It is particularly useful if the basic group is present as a substituent in the carbamic acid group, i.e., in the group Y of the formula set forth above. This is conveniently achieved by the use of N,N-dialkylalkanolamines or N,N-dialkylalkylenediamines in the preparation of component (B).

The components (A) and (B) are reacted in the presence of a reaction-inert solvent at from about 60° to 120° C. The proportions of the components are chosen so that the end product is free from epoxide groups and has sufficient protonatable basicity to enable it to be diluted with water, which corresponds to an amine number of at least about 30 mg KOH/g.

Since it is necessary to obtain an end product free, or substantially free, from epoxide groups, any stoichiometric excess of epoxide groups which may be present is reacted before, during, or after the reaction with component (B), with amino and/or carboxyl and/or hydroxyl compounds. These modifiers may be monofunctional or, if they are difunctional, they may also serve to lengthen the chains of the epoxy resins. Modifications may also be carried out by reacting the secondary hydroxyl groups present in the epoxy resins, or released by the reaction with component (B), with isocyanate compounds. Since the reactants may be polyfunctional compounds, the formulation used must be selected in order to prevent the mixture from gelling or becoming insoluble.

Further processing of the products according to the invention to produce water-dilutable paints using pigments, extenders, additives and adjuvants, as well as the application of the paints, particularly by the electrodeposition method, are described in the literature and are apparent from the information contained in the examples.

PRESENTLY PREFERRED EMBODIMENTS

The following examples illustrate the invention without restricting its scope. All the parts and percentages given are units by weight, unless otherwise stated.

EXAMPLE 1: REACTION WITH A URETHANE 105 parts of diethylethanolamine (0.9 mole) are reacted in 200 parts of diethyleneglycoldimethylether (DGDME) at 30° to 35° C. with 304 parts of TDI semi-blocked with 2-ethylhexanol until an NCO-value of zero is obtained. After the addition of 475 parts of a bisphenol A-epichlorohydrin epoxy resin having an epoxide equivalent weight (EEW) of 475, the temperature is increased to 75° to 80° C. and maintained for two hours. The final reaction product contains no epoxy groups and, after the addition of 55 mMole of formic acid/100 g of solid resin, it is readily diluted with water.

EXAMPLE 2: REACTION WITH AN ALLOPHANATE

As set forth in Example 1, 89 parts of dimethylethanolamine (1 mole) are reacted with 496 parts of TDI semi-blocked with n-butanol in 300 parts of N-methylpyrrolidone. After the addition of 950 parts of bisphenol A-epichlorohydrin epoxy resin (EEW 950), the mixture is reacted for two hours at 75° C. The reaction product contains no epoxy groups and, after the addition of 50 mMole of acetic acid/100 g of solid resin, it is completely dilutable with water.

EXAMPLE 3: REACTION WITH A SUBSTITUTED UREA 130 parts of diethylaminopropylamine (1 mole) in 186 parts of toluene are completely reacted with 304 parts of TDI semi-blocked with 2-ethylhexanol at 30° to 40° C. After the addition of 190 parts of a bisphenol A-epichlorohydrin epoxy resin (EEW 190), the mixture is reacted for two hours at 70° C. The secondary hydroxyl groups of the reaction product are then reacted with another 608 parts (2 mole) of the semi-blocked TDI of Example 2. The toluene is distilled off under vacuum and replaced with an equal amount of methoxypropanol. After the addition of 40 mMole of formic acid/100 g of solid resin, the binder is completely dilutable with water.

EXAMPLE 4: REACTION WITH A BIURET 102 parts of dimethylaminopropylamine (1 mole) are dissolved in 400 parts of DGDME and reacted with 624 parts (2 mole) of an isophoronediisocyanate semi-blocked with ethyleneglycolmonomethylether until all the isocyanate groups have been reacted. After the addition of 488 parts (1 mole) corresponding to 2.0 mole NH-groups of a reaction product of 1 mole of 1,6-hexamethylenediamine and 2 moles of 2-ethylhexylglycidylether and 1425 parts (3 equivalents) of a bisphenol A-epichlorohydrin epoxy resin (EEW 475), the mixture is reacted for three hours at 90° C. After the addition of 50 mMole of formic acid/100 g of solid resin, the binder is readily dilutable with water.

The resinous binders obtained in Examples 1-4 when used in a paint formulation provide products, in addition to having water-solubility characteristics, having good crosslinking characteristics to provide coatings which have good durability and resistance to corrosion.

As will be apparent to one skilled in the art, various modifications can be made within the scope of the aforesaid description. Such modifications being within the ability of one skilled in the art form a part of the present invention and are embraced by the appended claims.

It is claimed:

1. Cationic paint binders, water-dilutable after protonation, comprising the reaction products of
   (A) an epoxide compound having at least one epoxy group and
   (B) a substituted carbamic acid derivative having the formula

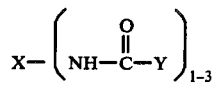

wherein
   X represents an aliphatic, cycloaliphatic, or aromatic moiety of a mono- or polyisocyanate compound which is reacted with a compound carrying a reactive H-atom,
   Y represents the group —OR, —NH—R, and

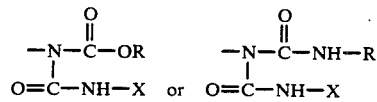

and
   R represents an alkyl or tertiary aminoalkyl group;
      wherein components (A) and (B) have been reacted at about 60° C.-120° C. with
   at least one of the components (A) or (B) containing basic groups whereby the end product contains protonatable groups corresponding to an amine number of at least about 30 mg KOH/g, and whereby the end product has an epoxide value of substantially zero.

2. The binder of claim 1 wherein Y represents the group —OR obtained by reacting an isocyanate group with an aliphatic alcohol or an N,N-dialkylalkanolamine.

3. The binder of claim 2 wherein Y is a substituted allophanate group obtained by reacting a urethane obtained according to claim 3 with an additional isocyanate compound.

4. The binder of claim 1 wherein group Y represents the group —NH—R obtained by reacting the isocyanate group with an aliphatic primary amine or an N,N-dialkylalkylenediamine.

5. The binder of claim 4 wherein the group Y is a substituted biuret group obtained by reacting a substituted urea obtained according to claim 5 with an additional isocyanate group.

6. The binder of claim 1 wherein the group Y carries a tertiary amino group.

7. The binder of claim 1 wherein the epoxy compound is a polyepoxide.

8. The binder of claim 7 wherein the polyepoxide is a diepoxide.

9. The binder of claim 7 wherein the polyepoxide of component (A) contains epoxy groups reacted with an amino, carboxyl, or hydroxyl compound.

10. The binder of claim 1 wherein said basic groups are tertiary-amino groups.

11. A water-dilutable paint comprising the cationic binders of claim 1.

12. The water-dilutable paint of claim 11 formulated as a cathodically depositable electrodeposition paint.

13. Process for preparing cationic paint binders, water-dilutable after protonation, comprising the steps of reacting
   (A) an epoxide compound having at least one epoxy group and
   (B) a substituted carbamic acid derivative having the formula

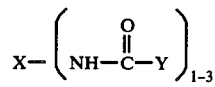

wherein
   X represents an aliphatic, cycloaliphatic, or aromatic moiety of a mono- or polyisocyanate compound which is reacted with a compound carrying a reactive H-atom,
   Y represents the group —OR, —NH—R,

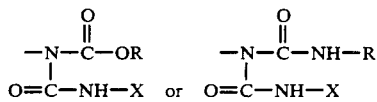

and

R represents an alkyl or tertiary-aminoalkyl group;
at a temperature of from about 60° to 120° C. in the presence of a reaction-inert solvent and controlling the reaction components and conditions whereby the end product contains protonatable groups corresponding to an amine value of at least about 30 mg KOH/g, and whereby the end product has an epoxide value of substantially zero.

14. The process of claim 13 wherein Y represents the group —OR obtained by reacting an isocyanate group with an aliphatic alcohol or an N,N-dialkylalkanolamine.

15. The process of claim 14 wherein Y is a substituted allophanate group obtained by reacting a urethane obtained according to claim 16 with an additional isocyanate compound.

16. The process of claim 13 wherein group Y represents the group —NH—R obtained by reacting the isocyanate group with an aliphatic primary amine or an N,N-dialkylalkylenediamine.

17. The process of claim 16 wherein the group Y is a substituted biuret group obtained by reacting a substituted urea obtained according to claim 16 with an additional isocyanate group.

18. The process of claim 13 wherein the group Y carries a tertiary amino group.

19. The process of claim 13 wherein the epoxy compound is a polyepoxide.

20. The process of claim 19 wherein the polyepoxide is a diepoxide.

21. The process of claim 19 wherein the polyepoxide of component (A) contains epoxy groups reacted with an amino, carboxyl, or hydroxyl compound.

22. The process of claim 13 wherein said basic groups are tertiary-amino groups.

* * * * *